No. 781,176. PATENTED JAN. 31, 1905.
C. H. BARRICK & L. P. ZIMMER.
COMBINED REIN HOLDER AND CHECKREIN.
APPLICATION FILED OCT. 21, 1903.
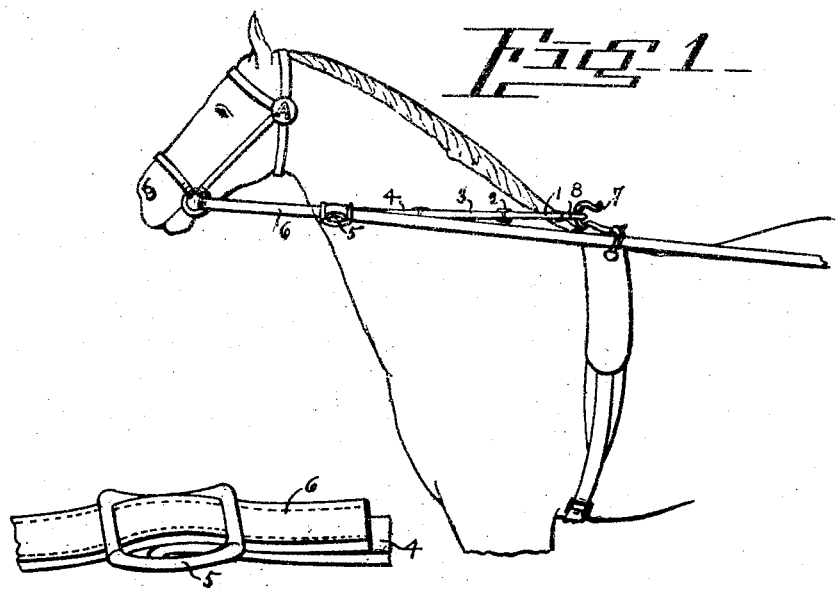
Fig. 1.
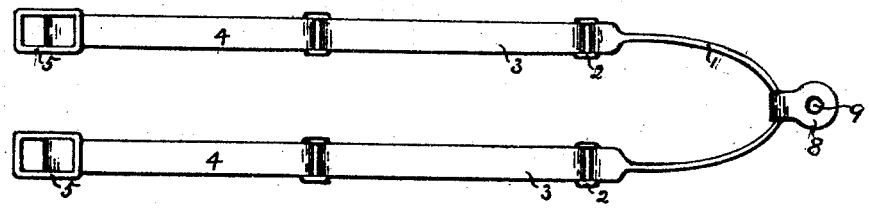
Fig. 2.
Fig. 3.
WITNESSES:
W. H. Stough
J. R. Bond
INVENTORS
Charles H. Barrick
Louis P. Zimmer
BY F. W. Bond
ATTORNEY No. 781,176.

Patented January 31, 1905.

UNITED STATES PATENT OFFICE.

CHARLES H. BARRICK AND LOUIS P. ZIMMER, OF CANTON, OHIO, ASSIGNORS OF ONE-THIRD TO LUTHER M. BARRICK, OF CANTON, OHIO.

COMBINED REIN-HOLDER AND CHECKREIN.

SPECIFICATION forming part of Letters Patent No. 781,176, dated January 31, 1905.

Application filed October 21, 1903. Serial No. 177,886.

*To all whom it may concern:*

Be it known that we, CHARLES H. BARRICK and LOUIS P. ZIMMER, citizens of the United States, residing at Canton, in the county of Stark and State of Ohio, have invented certain new and useful Improvements in a Combined Rein-Holder and Checkrein; and we do hereby declare that the following is a full, clear, and exact description of the same, reference being had to the annexed drawings, making a part of this specification, and to the figures of reference marked thereon, in which—

Figure 1 is a view showing our invention properly applied. Fig. 2 is a view showing one of the lines connected to the holder-straps. Fig. 3 is a detached view of the combined rein-holder and checkrein, showing the different parts properly connected.

The present invention has relation to a combined rein-holder and checkrein; and it consists in the novel construction hereinafter described, and particularly pointed out in the claim.

Similar numerals of reference indicate corresponding parts in all the figures of the drawings.

In the accompanying drawings, 1 represents the rear strap, to which is attached by suitable links or buckles 2 elastic straps 3, and to the forward ends of the elastic straps are connected the non-elastic straps 4, the forward ends of which non-elastic straps are provided with suitable links 5, which links are for the purpose of holding the reins 6, said reins being passed under the bars of the links 5, substantially as illustrated in Figs. 1 and 2. The strap 1 is connected to the rein-hook 7 by means of the connecting-head 8, which connecting-head is provided with the aperture 9, which aperture receives the rein-hook 7. It will be understood that the connecting-head should be connected to the strap 1 in any convenient and well-known manner. It will also be understood that the connecting-head is not absolutely necessary, owing to the fact that the strap 1 may be connected to the rein-hook 7; but we prefer to use the connecting-head, owing to the fact that the strap 1 will be liable to become detached from the rein-hook; but in many instances rein-hooks are so constructed that the strap 1 will be properly held without the use of the connecting-head 8.

It will be understood that the device herein shown will when properly applied act as a checkrein and at the same time will hold the forward ends of the lines or reins 6 taut, and thereby prevent any sagging of the reins, the object being to prevent the reins from coming under the forward ends of the shafts of the vehicle and at the same time giving to the reins a neat appearance.

It will be understood that by providing the elastic straps 3 the horse is free to move his head in either direction, owing to the fact that the elastic straps 3 will come and go by the movement of the horse's head. It will also be understood that the various adjustments can be made by bringing the links to or from the forward ends of the reins 6. By providing an elastic connection between the check-hook of a harness and making the connection to the lines forward of the check-hook and in the rear of the bridle-bit the horse thus reined is free to move his head either sidewise or up and down, whereas with a non-elastic connection between the check-hook and the bridle the pull is always the same and there is no elasticity. This is true regardless of the connection, whether it be a checkrein extended from the bits to the check-hook or whether a divided checkrein be employed and the divided checkrein formed of non-elastic material.

Having fully described our invention, what we claim as new, and desire to secure by Letters Patent, is—

The combination of a rear strap adapted for engagement with a rein-hook, elastic straps connected to the rear strap, non-elastic straps connected to the forward ends of the elastic
5 straps, driving-reins and said non-elastic straps adjustably attached to the driving-reins, substantially as and for the purpose specified.

In testimony that we claim the above we have hereunto subscribed our names in the presence of two witnesses.

CHARLES H. BARRICK.
  LOUIS P. ZIMMER.

Witnesses:
 J. A. JEFFERS,
 F. W. BOND.